Patented Mar. 13, 1923.

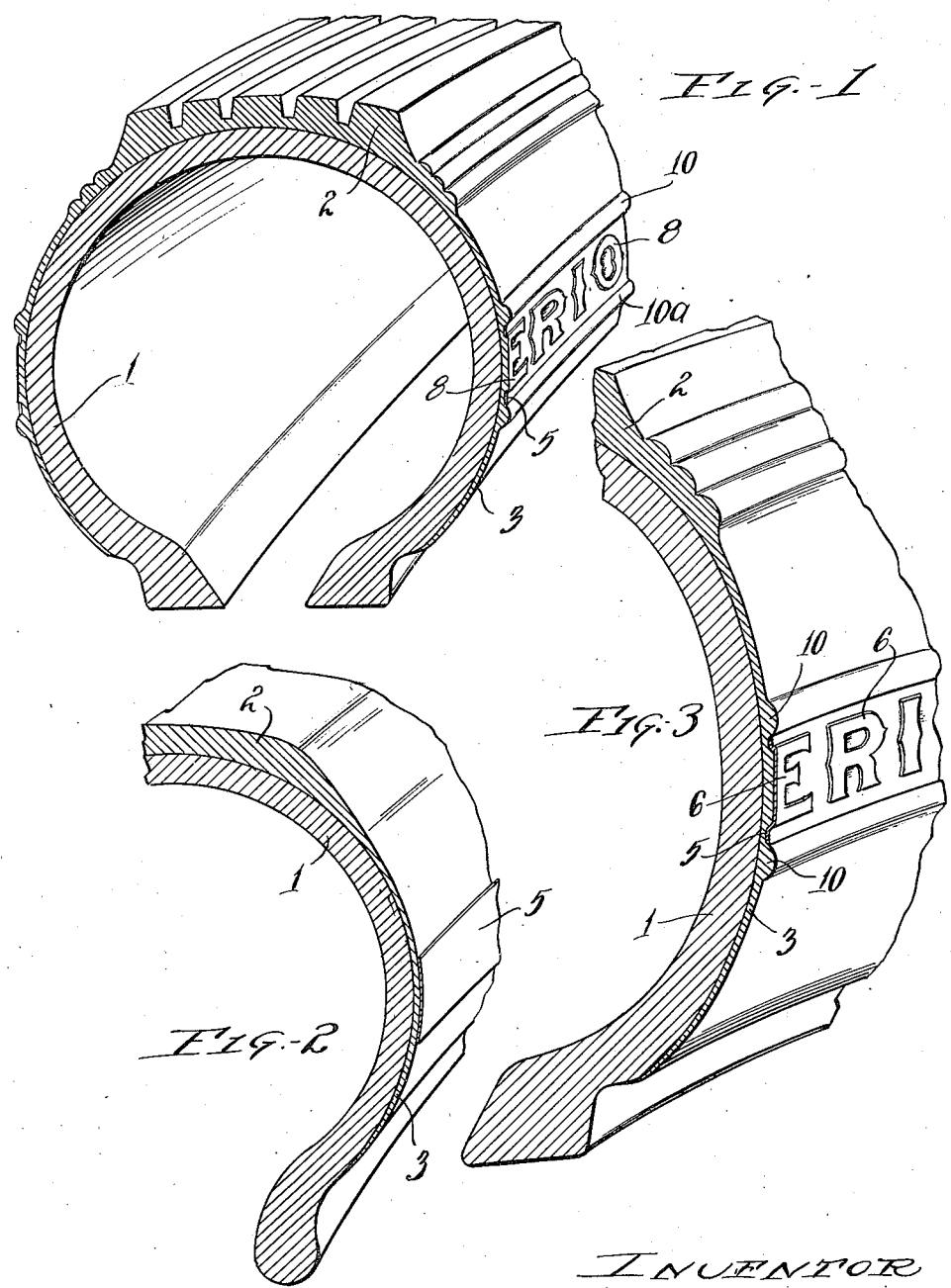

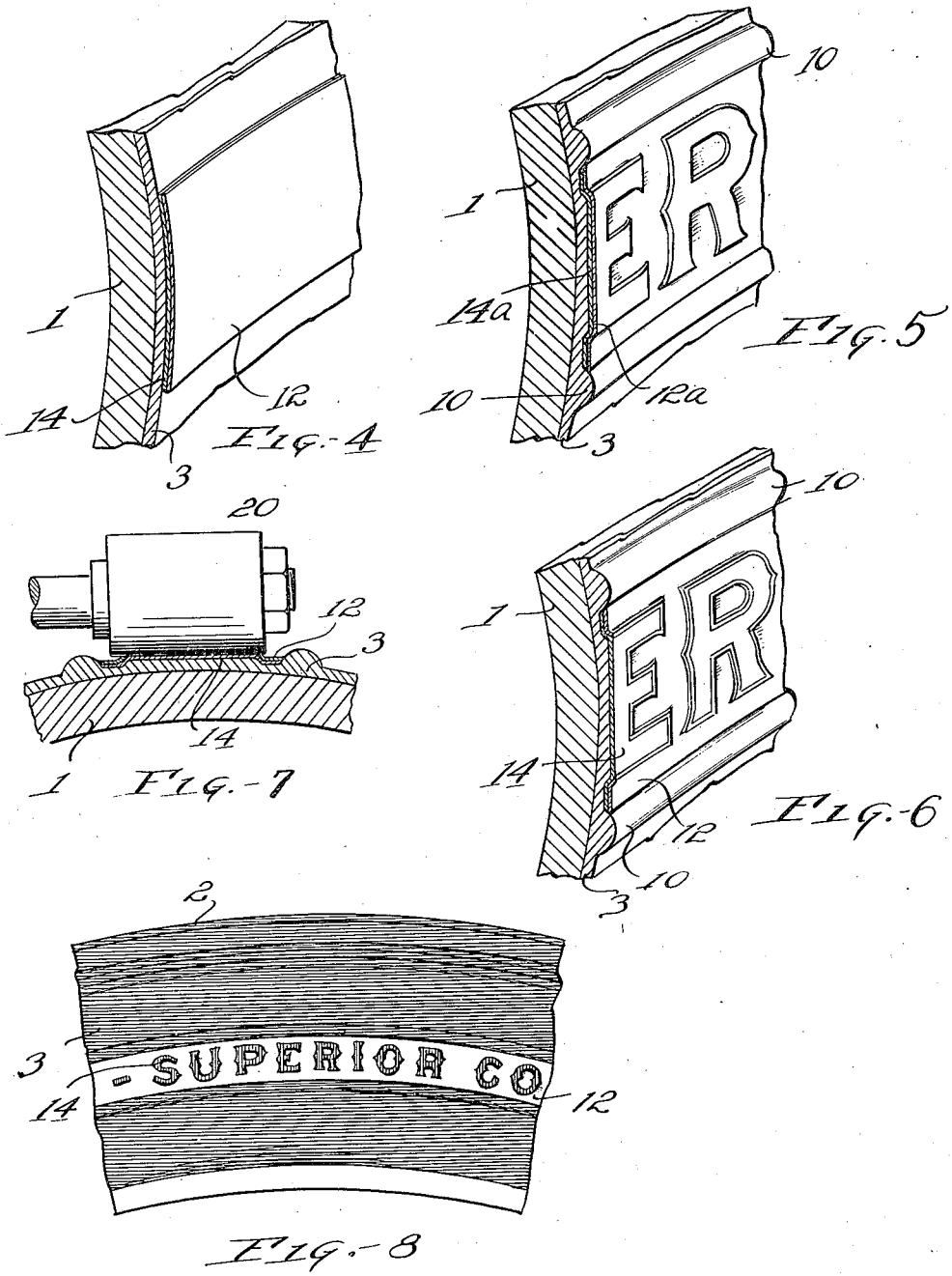

1,448,286

UNITED STATES PATENT OFFICE.

JACKSON D. COMSTOCK, OF CHESTER, WEST VIRGINIA.

METHOD OF DECORATING AUTOMOBILE TIRE CASINGS.

Application filed October 25, 1922. Serial No. 596,745.

*To all whom it may concern:*

Be it known that I, JACKSON D. COMSTOCK, a citizen of the United States, residing at Chester, in the county of Hancock and State of West Virginia, have invented a certain new and useful Improvement in Methods of Decorating Automobile Tire Casings, of which the following is a full, clear, and exact description, reference being had to the accompanying drawings.

This invention relates to a method of producing decorative effects, in the nature of colored letters or symbols in color contrast to its background, upon the surfaces of rubber articles, for example, the sides of tire casings and the invention is intended to include the articles so produced.

The essential object of the invention is to produce such decorative effects with a minimum amount of expense, and render the same most durable.

A still more specific object is to produce raised symbols, letters or similar devices on the sides of tire casings in the same molds as they are now made without intermediate steps save that of placing a rubber veneer over the zone in which these projections are raised, and after forming the article in the usual manner, vulcanizing the same, removing the veneer over the top surfaces of the projections to expose the different material underneath, on the projections only.

To illustrate my process, I have shown in the accompanying drawings, the manner of application to the sides of tire casings. The manner of accomplishing the above and other objects will become apparent in the description, referring to the drawings, and the essential characteristics are set forth in the claims.

In the drawings, Fig. 1 is a sectional perspective of a tire casing, showing the lettering framed by a strip of rubber on the side thereof; Fig. 2 is a similar sectional view showing the tire just before it is placed in the mold and having the strip of veneer on the side thereof; Fig. 3 is a view on a slightly enlarged scale showing the tire after the molding and vulcanizing in the usual manner; Fig. 4 is a sectional perspective showing the use of two layers of veneer of different colors; Fig. 5 is a similar view after molding; Fig. 6 is a similar view after removing the outer veneer and exposing the inner; Fig. 7 is a sectional view conventionally illustrating the use of a buffing wheel to trim the veneer; Fig. 8 is a side elevation of a tire casing showing the three colored effect produced.

In carrying out my process to produce decorative effect of the letters on the side of a tire, as illustrated in the drawings, I place a strip or ribbon of rubber of the desired width in a circle about the tire, preferably the entire circumference, upon the side, after completing the building of the tire but before formation and vulcanization in the mold. During the expanding of the tire in the mold, the letters are raised in the usual manner within the zone of this veneer or ribbon and after vulcanization and removal from the mold I may buff off the raised projections sufficiently to expose the rubber underneath, whereupon the veneer becomes a background or zone for the letters and the rubber of the side of the tire shows through.

Referring to the drawings by the use of reference characters, 1 indicates a tire carcass having the usual thread rubber portion 2, which as shown extends downwardly around the sides of the tire as at 3, substantially to the bead. When the tire has been built, but before vulcanization and molding, it has the general appearance indicated in Fig. 2 and at this time, I place the rubber strip indicated at 5 of a different color extending the same distance, preferably entirely, around the side wall of the tire. It adheres thereto as both the side wall and the strip are plastic rubber in an uncured state. This strip, as an example, may be raw rubber of approximately one sixty-fourth of an inch in thickness, and say an inch or so wide and need only be so located on the tire that it will accurately include the zone or the lettering when placed in a mold. The tire is then molded and vulcanized in the usual manner. This forms the projections on the tread, and the lettering under an internal pressure, which causes the rubber to fill the cavities, defining the lettering or decoration.

After removing the tire from the mold, the strip 5 extends over the projections forming the letters as is shown in Fig. 3. Here 6 indicates the letters and 5 the strip. The rubber of the side wall is forced outwardly into the letters. I preferably form these letters so that their outer surfaces are regular and even, for example, they may lie in a plane, whereby it is convenient to remove the rubber over the letters and expose the rubber 3 therethrough as indicated at 8 in Fig. 1. The removal of the veneer over the projections forming the letters or other objects may be accomplished by the use of a buffing wheel 20, Fig. 7, having surface corresponding to the surface of the face of the letters, that is, for example, the letters are formed in a plane, the buffing wheel may be substantially cylindrical and while passing over the letters, the veneer is removed at the top of the projections only.

It will be seen that such a treatment may produce a very pleasing effect on the side of a tire, for example, if the rubber of the tread and side walls is very dark or black and the strip light, such as white, we have around the side of the tire a white ribbon-like circle through which the black letters project. This decoration may be enhanced by raising beads or ribs at either side of the zone of the colored veneer strip, such for example, as indicated at 10, and 10$^a$.

A modification of the invention is illustrated in Figs. 4 to 8, by which I secure a three color effect, the body of the tire being one color, the zone framing the lettering or decorations another color, and the projections of the letters or decorations are still another.

To accomplish this I simply place two colored strips, for example, a white strip 12 upon a red strip 14 on the side wall rubber 3, these strips being in the nature of thin ribbons of raw rubber as previously described and placed upon the side of the tire before it is molded and vulcanized. After the molding operation both the strips will project upwardly at the lettering as shown at 12$^a$ and 14$^a$ in Fig. 5.

The outer veneer is then buffed off until the inner veneer is exposed producing the result indicated in Fig. 6 where the strip 12 is shown as cut away, exposing the rubber of the strip 14 therethrough and defining the shape of the letters, while at either side of the strips the color of the side wall appears. In these figures, raised ribs or beads are also shown as indicated at 10, being formed of the rubber of the side wall during the molding operation; Fig. 8 shows the effect of this three color where for example, the side wall of the tire is indicated as blue (which of course may be black or any other desired color) while the zone in which the letters appear is white and the letters themselves are red, being the color of the strip 14.

While I have shown the letters raised above the surrounding surface I find that to produce the coloring effect described, the decorative figures need be only molded to project above the surrounding surface an amount equal to the thickness of the veneer to be removed. In this case when finished the lettering or the like may lie in the surface of the article as may be sometimes desirable.

It is to be understood that while this invention is particularly useful and adaptable to tire casings, it may be applied to various forms of rubber articles. It will be seen that it is much more economical and practicable than methods heretofore used for decorating, such an inlaying of colored figures or decorative devices.

It will also be seen that the color will be very durable in fact, the example given would maintain the decorative effect throughout the life of the tire, whereas if this decoration is only painted on or applied by coloring methods to the surface, it will soon become worn off.

I claim:—

1. A method of decorating the sides of tire casings, or the like, consisting of placing a veneer of one color upon the side of the casing of another color while in the plastic state, molding the article under pressure to cause the material to flow in the cavities of the usual mold and forming projections within the zone of the veneer, vulcanizing the article in the forming mold, and after vulcanization removing the veneer on top of the projections.

2. A method of treating the letters or symbols upon the sides of a tire casing consisting of placing upon the side of a casing a veneer of a different color from that of the material underneath, then molding the casing, using internal pressure within the casing to cause the letters or symbols to project outwardly from the immediately surrounding surface within the zone of the veneer and vulcanizing the tire while in the same mold, and thereafter buffing off or otherwise removing the vulcanized veneer on the top of the projections to expose the material underneath.

3. A method of forming decorative characters or symbols upon the side of a pneumatic tire casing, the characters being of one color within a zone of another color and upon a background of still another color and formed upon the comparatively thick carcass of the casing, consisting of placing upon the side of the casing two veneer sheets of different colors and molding the article using pressure throughout the entire interior of the wall of the casing to cause projections to rise from the immediately surrounding surfaces within the zone of the superimposed sheets, and vulcanizing the article while held in the forming mold and thereafter buffing off the top surface of the projections to expose the under layer of the veneer.

4. A method of improving the appearance of a tire casing consisting of placing an arcuate thin strip of rubber upon the tire before molding, placing another strip of rubber over this and of a different color, each strip of veneer being a different color from the side wall coating of the usual comparatively thick carcass and then molding the tire and vulcanizing the same, causing projections in the nature of letters or symbols or the like within the zone of the strips, and thereafter buffing off the rubber of the outer strip on the top of the projections to expose the under strip, whereby the side wall of the tire may form a background of one color and the outer veneer becomes a zone of still another color framing the lettering.

In testimony whereof, I hereunto affix my signature.

JACKSON D. COMSTOCK.